Patented Jan. 10, 1939

2,143,286

UNITED STATES PATENT OFFICE 2,143,286

PROCESS FOR PRODUCING INORGANIC SULPHIDES

William H. Shiffler and Melvin M. Holm, Berkeley, Calif., assignors to Standard Oil Company of California, San Francisco, Calif., a corporation of Delaware No Drawing. Application July 8, 1935, Serial No. 30,353

5 Claims. (Cl. 23—181)

This invention relates to new and useful improvements in a process for producing sulphide solutions from by-product gases containing hydrogen sulphide and more particularly to a process wherein the gas employed contains hydrogen sulphide associated with odorous organic sulphur compounds.

The use of a solution, commonly known as "lime-sulphur", in which the major active ingredient is calcium pentasulphide ($CaS_5$) has become of very great importance in the control of parasitic infestations of agricultural and particularly of horticultural crops. The standard method of preparing such solutions was for a long time to boil a saturated solution of calcium hydroxide in water carrying excess lime and elementary sulphur in suspension. Such a method was decidedly wasteful of both lime and sulphur because useless products are inherent in the reaction involved. The process was also limited by unavoidable side reactions as to the concentration of calcium pentasulphide which could be built up in the solution.

A major advance was made by Volck, U. S. Patent No. 1,517,522, issued December 2, 1924, when he discovered that by reacting the customary aqueous suspension of sulphur and lime in the presence of hydrogen sulphide under properly controlled conditions, substantially all side reactions could be eliminated and a better product could thus be produced and with considerably greater economy than by any previously employed method. This process, however, has hitherto possessed a serious economic disadvantage in that it requires relatively pure hydrogen sulphide in order to produce a desirable and readily marketable product.

It is an object of the present invention to provide a process whereby readily available industrial gases containing but a few percent of hydrogen sulphide may be employed in the production of valuable sulphide solutions.

It is a further object of this invention to provide a process whereby hydrogen sulphide associated with other volatile odorous sulphur compounds may be utilized in the production of satisfactory sulphide compositions.

It is another object of our invention to provide a method whereby relatively pure hydrogen sulphide may be economically produced from by-product gases in which it is associated with other volatile sulphur compounds.

It is still a further specific object of this invention to provide a process and method whereby the by-product gases resulting from the cracking of sulphur rich petroleum oils may be utilized in the lime-sulphur reaction with the production of a satisfactory product.

It is also an object of this invention to provide a process whereby calcium hydrosulphide solutions free of odorous organic sulphur bodies may be produced from by-product gases containing hydrogen sulphide.

As is well known in the petroleum industry, the extensive use of the cracking reaction which has taken place during the past decade has made available very large volumes of by-product gas containing from a trace to ten or more percent of hydrogen sulphide. While many attempts have been made to utilize to advantage this substantially waste and in many cases nuisance hydrogen sulphide, but slight use has, so far, been developed for it because of its usual high dilution and because it is invariably associated with other volatile sulphur compounds which often interfere with the uses to which it might otherwise be put.

One such use which at first appeared promising was in the aforementioned process for producing insecticidal lime-sulphur solutions. It was soon found, however, that when cracking process gases were so employed, a product resulted which had an extremely foul and disagreeable odor and which was therefore refused by the trade. Quite naturally many schemes were proposed whereby it was hoped to overcome this difficulty, but in general, they were found to be either ineffective or too complicated and/or too costly to warrant adoption.

We have now discovered a principle through the application of which it is possible to effect an entirely practical separation of hydrogen sulphide from the objectionable, odor producing sulphur compounds that accompany it in most by-product gases, including those associated with or derived from petroleum. In the case of the above mentioned lime-sulphur process, this separation is accomplished during the operation by dividing the process into two steps corresponding to the two chemical reactions involved and interposing the purification step between them. Under other circumstances, the preparation of pure hydrogen sulphide by our method may constitute a step entirely independent of the reaction in which the hydrogen sulphide is to be used.

The solutions which are usually best adapted to the absorption of hydrogen sulphide are of an alkaline nature, the active material being either organic or inorganic. These solutions as a rule show a slight selectivity for that gas but none of them, so far as we are aware, is sufficiently selective to reject the accompanying sulphur compounds to an extent that they yield even approximately pure hydrogen sulphide on regeneration.

We have discovered, however, that the regeneration reaction is much more selective and that when an alkaline absorption liquor loaded with volatile sulphur compounds is submitted to a progressive regeneration by boiling, substantially all of the objectionable odor producing compounds are liberated with the first ten percent or so of the contained hydrogen sulphide. It is thus possible by discarding the first gas evolved on boiling such a solution to collect a later fraction of gas which is practically pure $H_2S$ and constitutes 80-90% or more of the hydrogen sulphide originally absorbed.

Where, as in the lime-sulphur preparation, an alkaline absorption solution may be employed which when regenerated to the point of adequate purity may be utilized as such, reliberation of the pure $H_2S$ gas is obviously unnecessary. This, together with other specific embodiments of our invention, will be readily understood from the following discussion and examples.

The reaction disclosed in U. S. Patent No. 1,517,522 for the production of lime sulphur is represented by the following equation:

$$Ca(OH)_2 + H_2S + 4S = CaS_5 + 2H_2O$$

As previously indicated, this process requires a source of hydrogen sulphide which is free from organic sulphur impurities in order to give a marketable product and for this reason hydrogen sulphide from petroleum cracking-still and similar gases has not been suitable. In the application of our invention which leads most directly to a satisfactory product, the foregoing single step reaction is divided into two steps corresponding to the following reactions:

I. $Ca(OH)_2 + 2H_2S = Ca(SH)_2 + 2H_2O$

II. $Ca(OH)_2 + Ca(SH)_2 + 8S = 2CaS_5 + 2H_2O$

When the reaction indicated by Equation I has proceeded to substantial completion, the resulting calcium hydrosulphide solution is boiled until an appreciable quantity of hydrogen sulphide is re-liberated according to the reverse of that equation as written. During such boiling the objectionable bodies will have been expelled from the solution and the second step, as indicated by Equation II, may then be carried out with the production of a pentasulphide solution free from undesirable odors.

In our preferred method of operation, 31 parts of lime is suspended in about 100 parts of water and is then reacted at atmospheric temperature with the available supply of hydrogen sulphide bearing gas until no more hydrogen sulphide is absorbed. While obviously the richer the gas in hydrogen sulphide, the more compact the apparatus for a given throughput, it has been found that gases containing as little as one percent of hydrogen sulphide may be satisfactorily employed.

After the lime slurry has been completely reacted with hydrogen sulphide and hence substantially converted to calcium hydrosulphide, it is run to an appropriate apparatus and boiled until approximately 10% of its volume has been distilled off. The boiled solution is then cooled somewhat, say to about 140° F., additional lime, 25 parts, and elementary sulphur, 128 parts coarsely broken or ground, are added and the mixture agitated until reaction is complete. This will usually require only a few minutes. The resulting solution containing approximately 200 parts of calcium pentasulphide is then filtered to remove solid impurities introduced with the lime and is ready for storage or distribution.

Since the amount of water used in preparing the original lime slurry is not critical, it is obviously desirable whenever possible to adjust it so that the final product will be at the desired strength without further attention. Such a predetermination is possible since substantially no side reactions take place in the process and calcium introduced as lime is usually converted to calcium pentasulphide with 98% or better yields.

While it will be obvious to one skilled in the art that no particular form of apparatus is absolutely essential to any of the steps in the foregoing process, it will also be obvious that continuous counterflow operation will be of advantage in both the gas absorption and purification steps. In the latter, a packed column having a boiler or merely a steam inlet at the bottom and provision for entry of the solution to be purified at a point near the top will permit of purification with a minimum loss of solution and of hydrogen sulphide.

Certain modifications in the proportions as used in the foregoing example with appropriate modifications in the process steps will also be obvious. For instance, all of the lime may be incorporated in the first step, whereupon substantially pure hydrogen sulphide will be liberated during the sulphur addition or second step of the process according to the following equation:

$$Ca(HS)_2 + 4S = CaS_5 + H_2S$$

This hydrogen sulphide may be returned to the first or absorption step or may be oxidized by well known methods to produce free sulphur which may be used in the process to replace purchased sulphur. When such procedure is adopted, the hydrogen sulphide and volatile sulphur bodies liberated during the purification or boiling step may be collected and also subjected to oxidation with a still further production of elementary sulphur.

Under other circumstances it may be convenient or desirable to utilize alkaline solutions other than lime, which has been discussed in the foregoing example because of its particular relation to the lime-sulphur reaction, in the preparation of pure hydrogen sulphide. This is possible since the selective liberation of volatile sulphur impurities before the liberation of considerable hydrogen sulphide appears to be a principle common to all such solutions.

For instance a solution consisting of from 20-30% sodium phenolate in water may be used as the absorbing solution at atmospheric temperature. After having absorbed hydrogen sulphide to the point of substantial saturation, the solution is boiled until hydrogen sulphide is freely liberated. The first few percent of gas evolved, usually not more than ten percent and often very considerably less, is discarded and the gas subsequently liberated, being hydrogen sulphide of high purity, is collected for any subsequent use desired.

Other alkaline salts of weak relatively non-volatile acids may be employed at appropriate concentrations in the same way. The water soluble organic bases such as triethanol-amine and diamino-propanol may be similarly employed to great advantage under the proper conditions.

Having now disclosed our invention and taught how it may be employed with considerable economic advantage, what we claim is:

We claim:

1. A process for separating weakly acid-reacting, volatile, malodorous organic sulphur compounds from the hydrogen sulphide with which they are associated in admixture with hydrocarbon gases which comprises absorbing said hydrogen sulphide and associated organic sulphur compounds in an alkaline reacting medium at a temperature substantially below its boiling point, of then subjecting the solution to boiling, and of isolating the gas so liberated until it consists substantially only of hydrogen sulphide.

2. The process as defined in claim 1 further characterized in that the alkaline reacting medium is an aqueous solution.

3. The process as defined in claim 1 further characterized in that the alkaline reacting medium is an aqueous solution of a strong inorganic base.

4. The process as defined in claim 1 further characterized in that the alkaline reacting medium is an aqueous solution of calcium hydroxide.

5. The process as defined in claim 1 further characterized in that the boiling is continued after isolation of the organic sulphur compounds and the substantially pure hydrogen sulphide thus liberated is collected.

WILLIAM H. SHIFFLER.
MELVIN M. HOLM.